Sept. 19, 1939. D. P. LAVIETES Re. 21,209

TOBACCO PIPE

Original Filed Dec. 2, 1932

David P. Lavietes
INVENTOR
BY Otto Munk
his ATTORNEY.

Reissued Sept. 19, 1939 Re. 21,209

UNITED STATES PATENT OFFICE 21,209

TOBACCO PIPE

David P. Lavietes, Brooklyn, N. Y.

Original No. 1,936,060, dated November 21, 1933, Serial No. 645,334, December 2, 1932. Application for reissue July 20, 1935, Serial No. 32,433

7 Claims. (Cl. 131—211)

My invention relates to improvements in tobacco pipes of the type in which the bit and bowl portions are separably united.

An object of my invention is to provide a construction affording a cool, sweet smoke with the possibility of easily discharging from the pipe any solid or semisolid matter which may deposit therein.

Another object is to construct the pipe of a minimum number of parts so that the features of a cool smoke and facility of cleaning may be embodied in pipes capable of being sold at a low price.

I accomplish these objects by providing the bit or mouthpiece portion of the pipe with a well, and connecting the bit and bowl members of the pipe by a plug having a duct or passage leading to and designed to discharge into the well.

Figure 1:
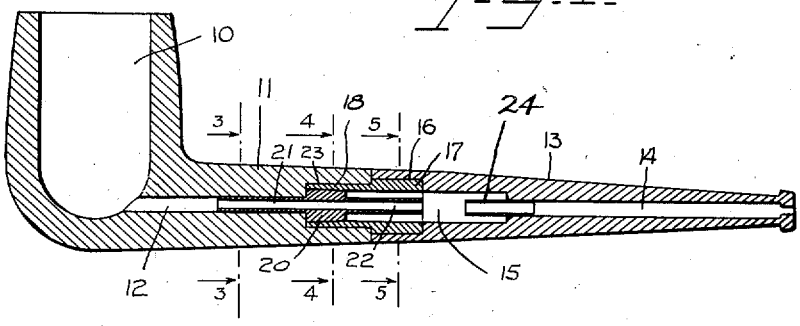
Figure 2:
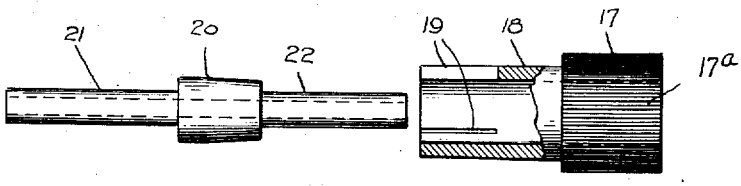
Figure 3:
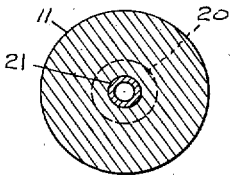
Figure 4:
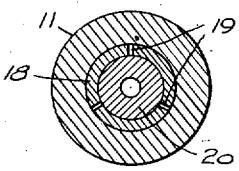
Figure 5:
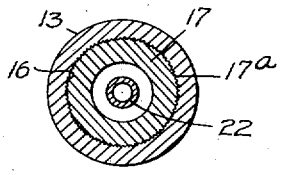

An illustrative embodiment of a preferred form of the invention is shown in the accompanying drawing in which Fig. 1 is a substantially central longitudinal sectional view of the improved pipe; Fig. 2 is a detail view of a plug and tenon used in the construction and Figs. 3, 4 and 5 are cross sectional views taken, respectively, on the line 3—3, 4—4 and 5—5 of Fig. 1, looking in the direction of the arrows.

Referring to the drawing, 10 denotes the bowl and 11 the bowl stem with a smoke passage or bore 12 leading from the former into and through the latter. The bowl stem 11 is shown without a well although, obviously, a well could be provided in the stem by suitably coring out the latter as well understood in this art.

The bit member is denoted 13 and is provided with the smoke passage or bore 14 leading to the well 15 adjacent the butt end of the bit. The inner face of a part of the wall of the well 15 is countersunk to provide a seat 16 for the sleeve portion 17 of a tenon which comprises said sleeve portion and a tubular portion 18. The tubular portion 18 is preferably although not necessarily slotted longitudinally as at 19.

Cooperable with the tenon is a plug member comprising an enlarged intermediate part 20 and tubular terminal parts 21 and 22, the internal passage from one end of the plug member to the other being continuous and unobstructed.

The end of the bowl stem 11 remote from the bowl 10 is cored out or countersunk as at 23 to receive the plug member and tenon tube when the parts of the pipe are assembled.

The outer surface of the sleeve portion 17 of the tenon is preferably knurled, as indicated at 17a, to effectively bite into the seat wall 16 and, if additional security of attachment be desired, cement may be applied between 16 and 17 so that for all practical purposes the tenon and bit are integral with each other.

To assemble the bowl and bit members the plug is inserted in the countersink 23 with the tubular terminal 21 inserted in the smoke passage 12. The intermediate enlargement 20 of the plug is shown as being tapered and while this is desirable it is not essential to the efficient functioning of the device. When the plug member is in place, the tube 18 of the tenon is telescoped over the enlargement 20, i. e., it is inserted between the plug and the wall of the countersink 23, and the bit forced toward the bowl until the parts occupy the positions shown in Fig. 1. The pipe is thus in condition for its intended purpose, with the tube 22 opening into well 15.

If it be desired to clean the pipe of any deposits which may have formed therein, the bit 13 is simply withdrawn from the bowl and shaken, whereupon any deposits which may be contained in the well 15 are discharged therefrom. The construction of the pipe is such that the well 15 is virtually the only place where any matter, solid or semisolid, will precipitate out of the smoke, so that the pipe as a whole remains exceptionally clean and, moreover, if any matter does deposit it is quickly and easily removable.

To prevent bits of tobacco or other solid matter entering the smoker's mouth, it is desirable to provide a short length of tube 24 extending from the inner end of the smoke passage 14 into the well 15.

I claim:

1. In a tobacco pipe comprising a bowl, a bowl stem with a countersunk seat at its end, a bit member having a well therein and a tenon having a sleeve portion in said well and a tubular portion projecting from the well, the combination therewith of a plug member in said countersunk seat, said plug comprising a tapered intermediate enlargement engageable by said tubular portion of the tenon and oppositely extending tubular terminals projecting respectively into the bowl stem and into said well.

2. In a tobacco pipe comprising a bowl, a bowl stem with a countersunk seat at its end and a bit member having a well therein, the combination therewith of a plug member in said seat comprising an intermediate enlargement and oppositely extending tubular terminals, and a tenon carried by said bit, said tenon comprising a sleeve portion secured in the well and a slotted tubular portion engageable with the intermediate enlargement of the plug.

3. In a tobacco pipe, comprising a bowl, a bowl stem and a bit member having a well therein, the combination therewith of a tenon having a sleeve portion extending into said well and fixed to the bit member and a tubular portion projecting from the well and slidably engageable with the bowl stem, and a plug member carried by the tenon and removable with the bit, said plug member having an enlarged intermediate portion removably engageable by the tubular portion projecting from the well, said plug having oppositely extending tubular terminals projecting form its enlarged portion, one of said terminals extending into the bowl stem and the other of said terminals extending into the tenon, said latter terminal having an outside diameter substantially smaller than the inside diameter of the tenon where opposite said latter terminal when the plug is engaged by the tenon.

4. A tobacco pipe embodying therein a bowl, a bowl stem having a smoke opening communicating therewith and an enlarged socket at the outer end thereof, a bit member having a well forming enlargement adjacent one end thereof, a sleeve permanently secured to said bit and having an opening therethrough of substantially the same diameter as, and communicating with, said well, and projecting beyond the end of said bit to form a tenon adapted to enter and engage the inner wall of the socket in said stem, a member carried by the tenon and removable with the bit, said member being engageable with but separable from said tenon closing the end of the tenon, and a tube of smaller diameter than said well permanently secured to said member, one end of which projects toward and opens into said well, and the other end of which passes through and opens outwardly of said last named member.

5. A tobacco pipe embodying therein a bowl, a bowl stem having a smoke opening communicating therewith and an enlarged socket at the outer end thereof, a bit member having a well forming enlargement adjacent one end thereof, a sleeve permanently secured to said bit and having an opening therethrough of substantially the same diameter as, and communicating with, said well, and projecting beyond the end of said bit to form a tenon adapted to enter and engage the inner wall of the socket in said stem, a member carried by the tenon and removable with the bit, said member being engageable with but separable from said tenon closing the end of the tenon, and a tube of smaller diameter than said well permanently secured to, and projecting from, the opposite ends of said member, said projecting ends communicating respectively with said well and with said smoke opening.

6. A tobacco pipe embodying therein a bowl, a bowl stem having a smoke opening communicating therewith and an enlarged socket at the outer end thereof, a bit member having a well forming enlargement adjacent one end thereof, a sleeve permanently secured to said bit and having an opening therethrough of substantially the same diameter as, and communicating with, said well, and projecting beyond the end of said bit to form a tenon adapted to enter and engage the inner wall of the socket in said stem, a plug carried by the tenon and removable with the bit, said plug being frictionally engageable with but separable from said tenon closing the end of the tenon, and a tube of smaller diameter than said well permanently secured to said plug, one end of which projects toward and opens into said well, and the other end of which passes through and opens outwardly of said plug.

7. A tobacco pipe embodying therein a bowl, a bowl stem having a smoke opening communicating therewith and an enlarged socket at the outer end thereof, a bit member having a well forming enlargement adjacent one end thereof, a sleeve permanently secured to said bit and having an opening therethrough of substantially the same diameter as, and communicating with, said well, and projecting beyond the end of said bit to form a tenon adapted to enter and engage the inner wall of the socket in said stem, a plug carried by the tenon and removable with the bit, said plug being frictionally engageable with but separable from said tenon closing the end of the tenon, and a tube of smaller diameter than said well permanently secured to, and projecting from, the opposite ends of said plug, said projecting ends communicating respectively with said well and with said smoke opening.

DAVID P. LAVIETES.